US009666380B1

(12) United States Patent
Lai et al.

(10) Patent No.: US 9,666,380 B1
(45) Date of Patent: May 30, 2017

(54) HIGH SURFACE AREA NANO FIBERS FOR SUPERCAPACITOR DEVICES

(71) Applicant: The United States of America as Represented by the Secretary of the Navy, Washington, DC (US)

(72) Inventors: William W. Lai, Ridgecrest, CA (US); Alfred J. Baca, Ridgecrest, CA (US); John D. Stenger-Smith, Ridgecrest, CA (US); Heather Meylemans, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 621 days.

(21) Appl. No.: 14/133,998

(22) Filed: Dec. 19, 2013

Related U.S. Application Data

(63) Continuation-in-part of application No. 14/096,244, filed on Dec. 4, 2013, now abandoned.

(60) Provisional application No. 61/746,410, filed on Dec. 27, 2012, provisional application No. 61/733,233, filed on Dec. 4, 2012.

(51) Int. Cl.
| | |
|---|---|
| *H01M 4/00* | (2006.01) |
| *H01G 11/24* | (2013.01) |
| *H01G 11/48* | (2013.01) |
| *H01M 4/04* | (2006.01) |
| *H01M 4/36* | (2006.01) |

(52) U.S. Cl.
CPC ............. *H01G 11/24* (2013.01); *H01G 11/48* (2013.01); *H01M 4/0402* (2013.01); *H01M 4/366* (2013.01)

(58) Field of Classification Search
CPC ....................................................... H01M 4/00
See application file for complete search history.

(56) References Cited

PUBLICATIONS

Hwang et al. ("Electrospun Core-Shell Fibers for Robust Silicon Nanoparticle-Based Lithium Ion Battery Anodes" NanoLetters 2012, 12, 802-807).*
U.S. Appl. No. 14/133,901, William Lai, et al.
U.S. Appl. No. 14/133,778, William Lai, et al.
U.S. Appl. No. 14/096,244, William Lai, et al.
S. Jeon, et al, "Fabricating Complex 3D Nanostructures With High Resolution Conformable Phase Masks," Proceedings of the NAS USA 101(34),12428-12433 (2004).
F. Hua, et al, "Processing Dependent Behavior of Soft Imprint Lithography on the 1-10 nm Scale," IEEE Transactions on Nanotechnology 5(3), 301-308 (2006).
(Continued)

*Primary Examiner* — Jacob Marks
(74) *Attorney, Agent, or Firm* — Charlene A. Haley

(57) ABSTRACT

An apparatus and method for the uniform dispersion of nano scaled redox particles in a conductive fiber including, combining at least one nano sized redox capable material having metal oxides and/or metals, at least one conductive binder, and at least one solvent to form electrically conductive metal imbedded fiber(s) by fiber spinning and the conductive polymeric binder having a molecular weight greater than 20,000 Daltons, and coating a substrate with the electrically conductive fiber(s) to form an active layer/substrate complex having a conductivity greater than 0.05 S/cm.

13 Claims, 3 Drawing Sheets

(56) References Cited

PUBLICATIONS

W. Zhou, Y. Huang, E. Menard, N.R. Aluru, J.A. Rogers and A.G. Alleyne, "Mechanism for Stamp Collapse in Soft Lithography," Applied Physics Letters 87, 251925 (2005).
Q. Xu, et al, "Approaching Zero: Using Fractured Crystals in Metrology for Replica Molding," Journal of the American Chemical Society 127(3), 854-855 (2005).
S. Jeon, et al. "3D Nanoporous Density Graded Materials Formed by Optical Exposures Through Conformable Phase Masks," Applied Physics Letters 89, 253101 (2006).
F. Hua, Aet al. "Processing Dependent Behavior of Soft Imprint Lithography on the 1-10 nm Scale," IEEE Transactions on Nanotechnology 5(3), 301-308 (2006).
R. Lin and J.A. Rogers, "Molecular-Scale Soft Imprint Lithography for Alignment Layers in Liquid Crystal Devices," Nano Letters 7(6), 1613-1621 (2007).
D.J. Shir, et al, "Three-Dimensional Nanofabrication with Elastomeric Phase Masks," Journal of Physical Chemistry B 111, 12945-12958 (2007).
J.-H. Jang, et al, "3D Micro- and Nanostructures via Interference Lithograhy," Advanced Functional Materials 17(16), 3027-3041 (2007).
B.W. Maynor, et al, "Supramolecular Nanomimetics: Replication of Micelles, Viruses, and Other Naturally Occurring Nanoscale Objects," Small 3(5), 845-849 (2007).
A.J. Baca, et al, "Molded Plasmonic Crystals for Imaging and Detection of Surface Bound Species by Surface Enhanced Raman Scattering", Applied Physics Letters, 2009.
A.J. Baca, et al, "Optimization of Nanopost Plasmonic Crystals for Surface Enhanced Raman Scattering", Journal of Physical Chemistry C, 115 (15), 7171-7178 2011.
Irvin, et al, "Enh. Electrochem. Resp. of Sol'n-Dep'd n-Doping Poly v Cocasting with Ionic Liq. J. P. via Cocasting with Ionic Liquid" J. P. Sci. B: Phys. 2012, 50(16),1145.

\* cited by examiner

HIGH SURFACE AREA NANO FIBERS FOR SUPERCAPACITOR DEVICES

CROSS-REFERENCE TO RELATED APPLICATIONS

This is a non-provisional patent application, claiming the benefit of, parent application Ser. No. 61/746,410 filed on Dec. 27, 2012 and 61/562,714 filed on Nov. 22, 2011, and is a continuation-in-part to patent application Ser. No. 14/096,244 filed on Dec. 4, 2013, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to a drop in replacement for current supercapacitor thin film active layers. Embodiments of this invention include ionic liquids, polymer and non-polymer materials in the form of fibers embedded into the active layer or directly or indirectly associated with the substrate. This will allow for the increase of charge capacity without sacrificing charging and discharging rates.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Typical organic thin film supercapacitors consist of two active layers, the acceptor and the donor. The electrochemical charging and discharging of the thin films are rather predictable. The charges nearest to the surface will move faster than charges that are situated deeper in the layer (in and out). Charge capacity can be described as being proportional to film thickness while the charging and discharging rate can be described as being inversely proportional to thickness. Because of these two relationships, increasing one property comes at the expense of decreasing the other. For example, thick films can have very high energy density but have very low power density. Electro spinning is a materials processing method where the resulting product is a fiber. By varying the size of the fiber, the surface area can be adjusted to fit a specific application. For supercapacitors, the desired effect is maximized when the surface area to volume ratio is maximized.

For organic supercapacitor where charge is stored throughout the volume of the active material, film thickness is directly proportional to the amount of stored charge and inversely proportional to the charging and discharging rates. Because of this relationship, one usually has to choose whether to maximize stored charge (power) or charging and discharging rates (energy). Maximizing one usually comes at the cost of minimizing the other. Since the charges are distributed throughout the material, charges that are closest to the surface will migrate out of the material faster than the charges that are located further into the material. At some point, when films are sufficiently thick charges can be considered permanently trapped on the time scale of the discharge. In this case, they not only not contribute to the power calculation but also serve as an impediment to the charging process.

Figure 1:
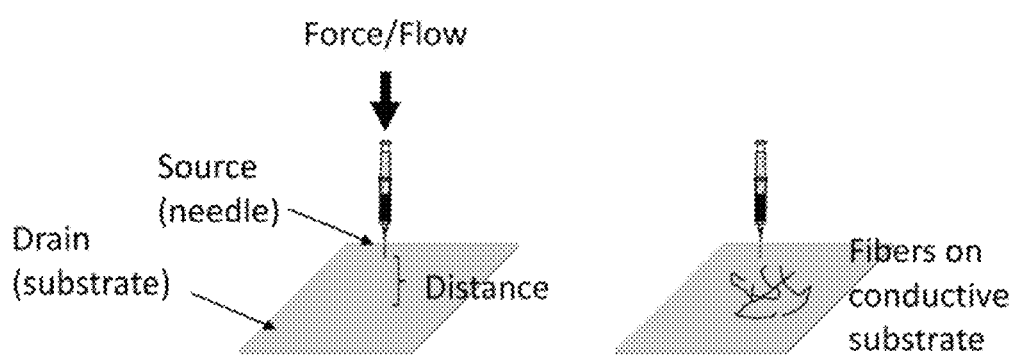
FIG. 1 is a side perspective view of fibers being spun onto a substrate, according to embodiments of the invention.

Electrospinning is a process by which fibers are created by varying the concentration of the processing solution, the field in which the solution is subjected to and the conductivity of the solution (see FIG. 1). The main difference between electrospinning and traditional mechanical fiber extrusion is that the fiber dimension (width) of the eletrospun fiber can be controlled to sub-micron scale. Variable 1 for the control of fiber size is the concentration of the processing solution, where higher concentrations are recommended for fiber spinning. Once a solution falls below a critical concentration, splattering tends to result instead of fiber formation. Variable 2 for the control of fiber size is the field that the solution is injected into. Field (F) can be further broken down into two controllable terms, voltage (V) and distance (d), where the relation is $F=V/d$. Lower voltages tend to result in fiber formation. Higher voltages tend to form interconnected networks. Distance (d) is the distance between the nozzle where the solution is injected and the ground, where the fibers are typically deposited. Variable 3 for the control of fiber size is the conductivity of the solution, where higher conductivities are desired over lower conductivities. Either the material or the binder or the vehicle can govern conductivity of the solution. One, two or all three components must be inherently conductive. Solutions that are not conductive, in other words insulating, will not spin fiber. Typically conductive polymers (MEH-PPV, P3HT) are used. In cases where the polymer is not conductive (polystyrene) a conductive vehicle (DMF, chloroform) can be used. In cases of spinning fibers of molecular species, a polymeric binder (polystyrene) can be used.

The upper limits of the fiber layer thickness would be 400-500 microns. Thicker films may be subject to diffusion control and limit the specific power of the device. The ratio of material to ionic liquid in the mat ranges from 1:1 to 10:1 (material:ionic liquid). In general, smaller fibers equate to more surface energy. For redox applications, an embodiment would include the fibers ranging in size of about 5-10 microns. Anything smaller would be unnecessary for purposes of redox processes.

Mechanical extrusion and molding are other types of fiber extrusion that can be used with embodiments of the invention. For sub-micron dimensions, electrospinning works well.

Embodiments of this invention relate to methods of using nano fibers as a replacement for typical thin films. Transitioning from a smooth film to a system of nano fibers will result in the increase of surface area by several orders of magnitude. This new material will essentially behave as having "bulk surface" properties. Namely the ability to increase charge capacity without sacrificing the charging and discharging rates.

Film thickness is directly proportional the amount of stored charge and inversely proportional to the charging and discharging rates. By increasing the surface area, the amount of charge that is stored can be increased without sacrificing charging and discharging rates.

The fibers will be a drop-in replacement for the standard smooth thin films. By having fibers instead of thin films, the ionic liquid or electrolyte and medium can intercalate with the active material, forming a new bulk material with "bulk" surface behavior. By increasing the surface area, more charge can be stored in the active layer without sacrificing the rates that these materials can be charged and discharged. In essence, these materials can be treated as a single material with increased usable volume while maintaining or exceeding the charging and discharging rates of the comparable smooth thin film.

The goal to increasing surface area is to maintain the high energy density of thick electrodes, while maintaining the fast response of thin electrodes. The best analogy is human lungs—the volume capacity is great and because of the high surface area, the transport of oxygen is very fast. Our films would have a high volume (energy density) and a high surface area (high power), something that is sorely lacking in batteries.

Films made by co-casting with ionic liquids formed a porous active layer. Earlier work by our laboratory illustrated the differences between the BBL and N-BBL polymers with the ionic liquid and without. The films cast with the ionic liquid show much more capacity and a very stable capacity over many hundreds of cycles, whereas the films cast without the ionic liquid initially show very little capacity with a gradual growing in process that leveled off after 200 cycles. Similar results were obtained with other polymers.

The simplest system would be the 2-component system, consisting of the interested material and the vehicle. The interested material can be literally anything. Typically the material is a polymer. This is because only polymers, with a sufficient molecular weight can be spun into fibers. Molecular species cannot be spun into fibers, that problem will be addressed in later paragraphs.

For the supercap embodiments, the interested materials were electroactive polymers. This addressed several concerns, the two main being something polymeric with a sufficiently high molecular weight that would spin fibers and that electroactive polymers are conductive, which is also important in the spinning processes. For the supercap embodiments, the electroactive polymers were spun were P3HT and MEH-PPV. There are countless of other polymers that can be used, both available through commercial sources and through literature preps.

Interested materials don't have to be limited to polymeric species. Binders only come into play if the interested material is non-polymeric. In which case the binder will be polymeric and used to form the basis of the fiber.

What we noticed from these encapsulated fibers was that because of the surface energies of the fibers, the encapsulated species were distributed fairly uniformly, in the sense that under the right spinning condition, they did not aggregate. Another component is the vehicle. The vehicle in this embodiment includes the solvent, or whatever will dissolve the material so that the system can be injected into the field. Other than as a way to dissolve the material, the vehicle can also increase conductivity. Typically, the more conductive the system is, the better (finer, more defined) the fibers are. In the case of the supercap embodiment, chloroform and DMF were used as the vehicle, but anything that can dissolve the material can be used. If the material is inherently conductive, then the vehicle can be just about anything that will dissolve the material. If the materials are non-conductive, such as polystyrene, then the vehicle chosen would have to be conductive.

To summarize, if the interested material can form fibers (polymeric with a sufficient molecular weight), then a 2component system is needed. If the interested material cannot form fibers (non-polymeric, or polymeric with a insufficient molecular weight (small chain oligomers)), then a polymeric binder with a sufficient molecular weight for forming fibers will be needed. Whether a 2 or 3 component system will depend on the ability for the interested material to form fibers.

The conductivity of the system will be dependent on each of the component. If the interested material and solvent results in a solution of suitable conductivity, then the solution can be injected into the field. If it does not meet the minimum conductivity, the either a more conductive solvent or a conductive additive can be added.

A second approach to increasing surface area is by nano-imprinting. The advantages of this approach are the nanoscale features are reproducible, as opposed to the randomness of the pores made by co-casting with ionic liquid. The processes for stamping as well as AFM images of stamped films are shown below.

Embodiments of the invention outline a method where both specific power and specific energy can be increased without having to sacrifice one for the other. This will be done by introducing nano features unto standard smooth thin films, thus making the bulk material behave as a surface material.

Previous methods for accomplishing similar ends are very limited. One approach would involve etching with harsh chemicals (patterning). These methods are difficult to employ for many inorganic surfaces, or are undesirable for post applications of the patterned material. The chemicals used in these processing techniques severely affect the optical and or electrical properties of the resulting thin films and limit the application space for these materials. Other methods include the growth of Nanowire templates such as Zinc Oxide or silicon nanowires grown on substrates that are used for electrode making. More recent efforts use carbon nanotubes and graphene materials used as the high surface area template materials. Although, great promise has been demonstrated with these approaches the cost of making this substrates can be high and also labor intensive.

Methods that use non-destructive or subtractive patterning techniques are highly desirable for these applications due to the benign conditions employed during the printing processing techniques. Herein we report an optical patterning technique assisted by soft nano-imprint processing for polymer thin films.

In embodiments, a layer (a masking material such as photoresist) is coated onto the substrate. A soft stamp is placed into conformal contact onto the substrate. The soft stamp can be made from PDMS and contains nano-pattern of interest. After placing the stamp into contact with the material the sample is heated, removed and allowed to cool to room temperature. Upon removal of the soft stamp nano-scale features are patterned into the polymer and the inverse tone of the resist pattern is transferred onto the substrate via specialized etching strategies.

The advantage of this approach is that the processing is done directly onto the polymer film without the use of expensive optical components for creating patterned substrates.

Embodiment of the invention generally relate to methods for creating an electrically conductive polymer mat including, combining ionic liquids with electrically conductive polymers and forming electrically conductive porous fiber networks from polymers having a molecular weight greater than 20,000 Daltons, and coating a substrate with the electrically conductive fiber networks to form an active layer/substrate complex having a conductivity greater than 0.05 S/cm. Other embodiments of the invention generally relate to electrically conductive polymer mats including, at least one ionic liquids with electrically conductive polymers formed to produce conductive fiber(s) by fiber spinning and the fibers having a molecular weight greater than 20,000 Daltons, and at least one substrate with the electrically conductive fiber(s) to form an active layer/substrate complex having a conductivity greater than 0.05 S/cm.

Yet other embodiments of the invention generally relate to methods for creating an electrically conductive polymer mat including, combining at least one electroactive conductive polymeric material and at least one solvent to form electrically conductive fiber(s) by fiber and the fibers having a molecular weight greater than 20,000 Daltons, and coating a substrate with the electrically conductive fiber(s) to form an active layer/substrate complex having a conductivity greater than 0.05 S/cm. Still yet other embodiments of the invention generally relate to electrically conductive polymer mats including, at least one electroactive conductive polymeric material and at least one solvent formed to produce electrically conductive fiber(s) by fiber spinning and the fibers having a molecular weight greater than 20,000 Daltons, and at least one substrate with the electrically conductive fiber(s) to form an active layer/substrate complex having a conductivity greater than 0.05 S/cm.

Embodiments of the invention generally relate to methods for the uniform dispersion of nano scaled redox particles in a conductive fibers including, combining at least one nano sized redox capable material having metal oxides and/or metals, at least one conductive binder, and at least one solvent to form electrically conductive metal imbedded fiber(s) by fiber spinning and the conductive polymeric binder having a molecular weight greater than 20,000 Daltons, coating a substrate with said electrically conductive fiber(s) to form an active layer/substrate complex.

Yet other embodiments of the invention generally relate to active layer(s) including, at least one non-polymeric redox capable material having a metal and/or metal oxide, at least one conductive binder, and at least one solvent formed to produce electrically conductive fiber(s) with embedded redox cores by fiber and the fibers having a high molecular weight greater than 20,000 Daltons, and at least one substrate with said electrically conductive fiber(s) to form an active layer/substrate complex having a conductivity greater than 0.05 S/cm. In still yet other embodiments, the invention includes active layer/substrate complexes produced by the methods herein.

In embodiments, the ionic liquid(s) is selected from the group consisting ethyl methyl imidazolium-bistrifluoromethanesulfonylimide, ethyl methyl imidazolium-Acetate, butyl methyl imidazolium-methanesulfonate, butyl methyl imidazolium-methylsulfate, butyl methyl imidazolium-thiocyanate, butyl methyl imidazolium-acetate, ethyl methyl imidazolium-ethyl sulfate, ethyl methyl imidazolium-methanesulfate, ethyl methyl imidazolium-thiocyanate, tetrabutylammonium-methyl suflate, 1,2, 3 trimethylimidazolium methyl sulfate and any other salt that is a liquid at or around room temperature. In embodiments, the conductive polymer(s) is selected from the group consisting poly 3-hexylthiophene, Poly(2-methoxyl-5-(2-ethylhexoxy) 1,4-phenylene vinylene, Poly(bis-2,5 (N-methyl, N-hexyl) 1,4-phenylene vinylene, Poly(ethylene dioxythiophene), Poly(propylene dioxythiophene), poly(pyrrole), substituted poly(pyrrole) and any other conjugated electroactive polymer. In embodiments, the substrate(s) is selected from the group consisting of indium tin oxide, thin metal films, thin metal films on glass, silicon wafer, and any combination thereof.

Embodiments may further include embedding the fibers in an active layer of photosensitive conformable material that is optically transparent. In other embodiments, the active layer is used as an anode in an electrochemical battery. In other embodiments, the active layer is used as a cathode in an electrochemical battery. In other embodiments, the active layer is used as a cathode in a supercapacitor. In other embodiments, the active layer is used as an anode in a supercapacitor. In embodiments, the conformable material(s) is selected from the group consisting of epoxies, polyimides, and other polymer materials that is photopatternable. In embodiments, the solvent is conductive having a minimum conductivity of 100 S/cm.

In embodiments, the electroactive conductive polymeric material(s) is selected from the group consisting poly 3-hexylthiophene, Poly(2-methoxyl-5-(2-ethylhexoxy)1,4-phenylene vinylene, Poly(bis-2,5 (N-methyl, N-hexyl) 1,4-phenylene vinylene, Poly(ethylene dioxythiophene), Poly(propylene dioxythiophene), poly(pyrrole), substituted poly(pyrrole), and any other conjugated electroactive polymer. In embodiments, the solvent(s) is selected from the group consisting of chloroform, dimethyl formamide, chlorobenzene, dichlorobenzene, water, and any combination thereof. In embodiments, the substrate(s) is selected from the group consisting of indium tin oxide, thin metal films, thin metal films on glass, doped silicon wafer or other conductive materials. In embodiments, the binder(s) is selected from the group consisting poly 3-hexylthiophene, Poly(2-methoxyl-5-(2-ethylhexoxy)1,4-phenylene vinylene, Poly(bis-2,5 (N-methyl, N-hexyl) 1,4-phenylene vinylene, Poly(ethylene dioxythiophene), Poly(propylene dioxythiophene), poly(pyrrole), substituted poly(pyrrole), and any other conjugated electroactive polymer.

In embodiments, the nano sized redox capable material(s) is selected from the group consisting viologens, substituted viologens, and electron-poor conjugated materials, fullerenes, and any other material capable of electrochemical reduction.

EXAMPLES

A nano-patterning method that relies on a conformable phase mask with sub-wavelength features of relief embossed onto its surface was pursued [A. J. Baca, Jason Montgomery, Tu Truong, Lee Cambrea, "Optimization of Nanopost Plasmonic Crystals for Surface Enhanced Raman Scattering", Journal of Physical Chemistry C, 115 (15), 7171-7178 2011; A. J. Baca, Tu Truong, Lee Cambrea, Jason Montgomery, Stephen Gray, Daner Abdula, Jimin Yao, Ralph G. Nuzzo and John A. Rogers, "Molded Plasmonic Crystals for Imaging and Detection of Surface Bound Species by Surface Enhanced Raman Scattering", accepted to Applied Physics Letters, 2009.]

The approach is simple due to the stamp having all of the optics built into it. Soft lithographic procedures of casting and curing of elastomers based on polydimethylsiloxanes (PDMS) or perfluoropolyethers (a-PFPE) against patterns of relief on a 'master' yield masks with relief structures in the geometry of the resist. A single master can yield many such masks; each mask can be used many times.

Optimized versions of these elastomers enable replication with molecular scale fidelity [D. J. Shir, S. Jeon, H. Liao, M. Highland, D. G. Cahill, M. F. Su, I. F. El-Kady, C. G. Christodoulou, G. R. Bogart, A. V. Hamza and J. A. Rogers, "Three-Dimensional Nanofabrication with Elastomeric Phase Masks," *Journal of Physical Chemistry B* 111, 12945-12958 (2007); S. Jeon, J.-U. Park, R. Cirelli, S. Yang, C. E. Heitzman, P. V. Braun, P. J. A. Kenis, and J. A. Rogers, "Fabricating Complex Three Dimensional Nanostructures With High Resolution Conformable Phase Masks," *Proceedings of the National Academy of Science USA* 101(34), 12428-12433 (2004); F. Hua, Y. Sun, A. Gaur, M. A. Meitl, L. Bilhaut, L. Rotkina, J. Wang, P. Geil, M. Shim, J. A. Rogers and A. Shim, "Polymer Imprint Lithography with Molecular-Scale Resolution," *Nano Letters* 4(12), 2467-2471 (2004); F. Hua, A. Gaur, Y. Sun, M. Word, J. Niu, I. Adesida, M. Shim, A. Shim and J. A. Rogers, "Processing Dependent Behavior of Soft Imprint Lithography on the 1-10 nm Scale," *IEEE Transactions on Nanotechnology* 5(3), 301-308 (2006); R. Lin and J. A. Rogers, "Molecular-Scale Soft Imprint Lithography for Alignment Layers in Liquid Crystal Devices," *Nano Letters* 7(6), 1613-1621 (2007)]

A key feature of the masks is their ability to establish intimate, conformal contact with the surface to be patterned, and achieving optical alignment with nanometer precision in the out of plane direction, through the use of generalized adhesion forces, without the use of applied pressure or precision alignment stages. [Q. Xu, B. T. Mayers, M. Lahav, D. V. Vezenov and G. M. Whitesides, "Approaching Zero: Using Fractured Crystals in Metrology for Replica Molding," *Journal of the American Chemical Society* 127(3), 854-855 (2005); B. W. Maynor, I. LaRue, Z. Hu, J. P. Rolland, A. Pandya, Q. Fu, J. Liu, R. J. Spontak, S. S. Sheiko, R. J. Samulski, E. T. Samulski and J. M. DeSimone, "Supramolecular Nanomimetics: Replication of Micelles, Viruses, and Other Naturally Occurring Nanoscale Objects," *Small* 3(5), 845-849 (2007); W. Zhou, Y. Huang, E. Menard, N. R. Alum, J. A. Rogers and A. G. Alleyne, "Mechanism for Stamp Collapse in Soft Lithography," *Applied Physics Letters* 87, 251925 (2005)]. Light passing through the mask generated a distribution of intensity that can expose a layer of a photosensitive material, throughout its thickness (see FIG. 3).

Using a photopolymer, removal of the mask and developing away the parts of the layer that are not cross-linked by the exposure light yielded a 3D nanostructure in the geometry of the intensity distribution, with feature sizes as small as 50 nm. Because exposure occurs in proximity to the surface of the mask, this technique is referred to as Proximity field Nano Patterning (PnP). This proximity geometry relaxes requirements on the spatial and temporal coherence of the light source compared other coherent optical patterning methods—even a handheld lamp with an interference filter can be used. Only the spot size of the light source and the size of the phase mask limit the size of the patterned areas with this technique; areas in the square meter range are possible. [A. J. Baca, Jason Montgomery, Tu Truong, Lee Cambrea, "Optimization of Nanopost Plasmonic Crystals for Surface Enhanced Raman Scattering", Journal of Physical Chemistry C, 115 (15), 7171-7178 2011; S. Jeon, Y.-S. Nam, D. J.-L. Shir, J. A. Rogers and A. Hamza, "Three Dimensional Nanoporous Density Graded Materials Formed by Optical Exposures Through Conformable Phase Masks," *Applied Physics Letters* 89, 253101 (2006).]

Figure 2:
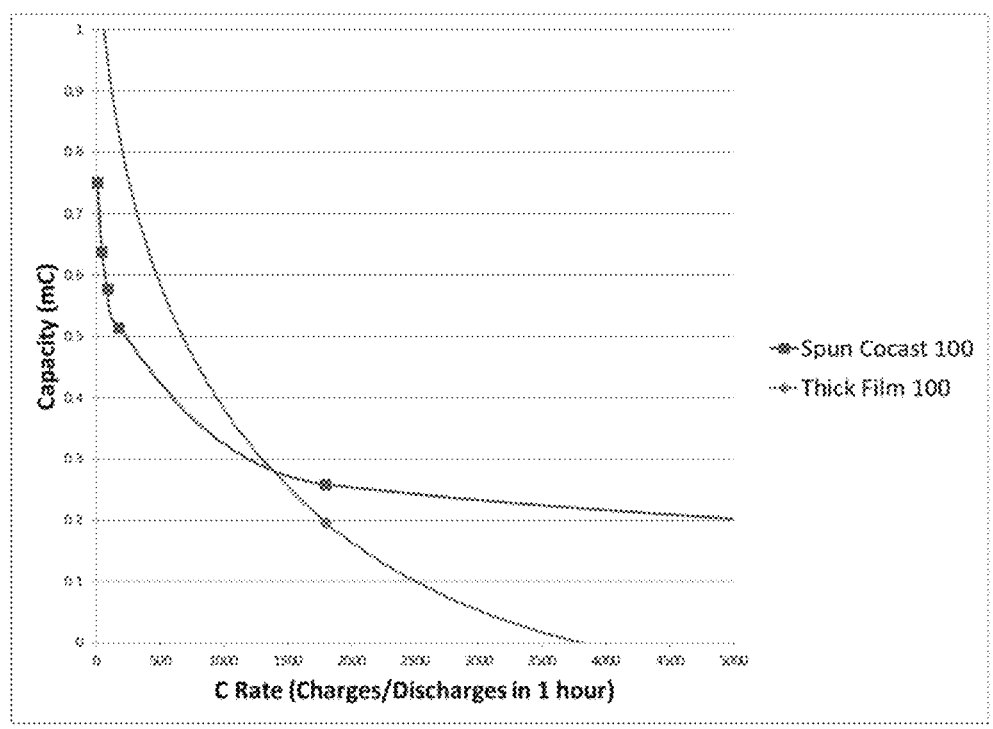
FIG. 2 is chart demonstrating the superior performance of high surface area electrode versus thick film at extremely fast rates, according to embodiments of the invention.

High surface area supercapacitors were constructed and the energy and power density were measured and compared to supercapacitors constructed from thin films and supercapacitors constructed from thick films. FIG. 2 shows that, while the thick films have higher energy density at low power settings, the energy and power density of the high surface area films on both relative and absolute scales are higher for the high surface area films at discharge rates of higher than 1500 per hour.

Figure 3:
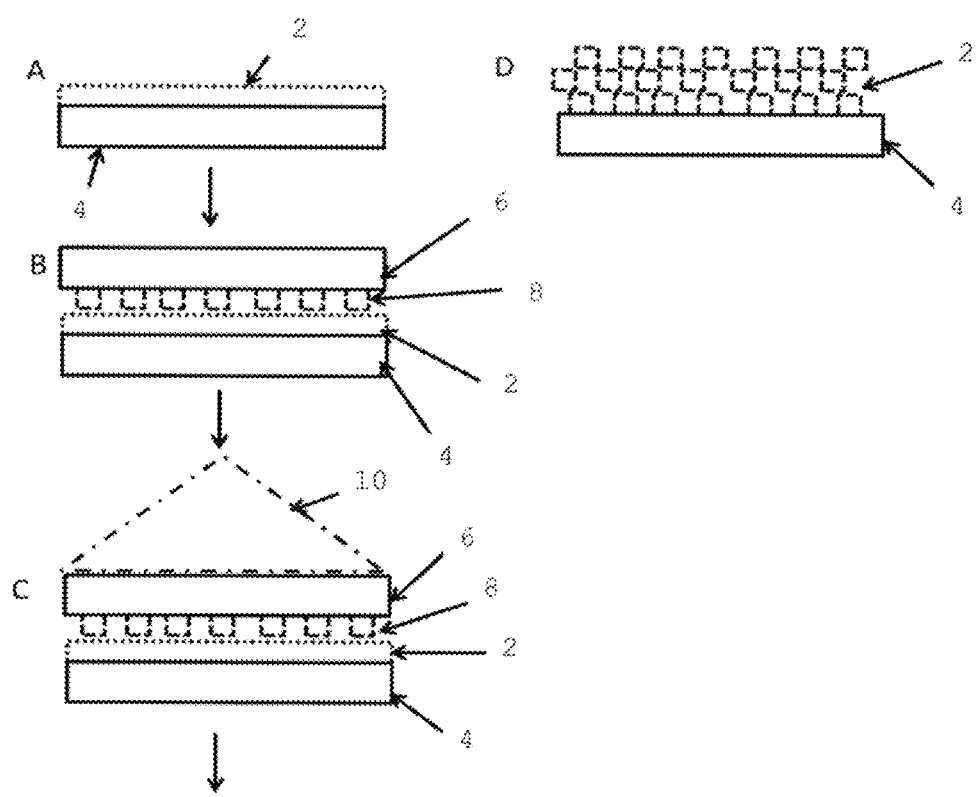
FIG. 3 is a perspective cross section view showing how a high surface area electrode is achieved by Proximity field nano Patterning (PnP), according to embodiments of the invention.

FIG. 3 is a flow chart showing how a high surface area electrode is achieved by Proximity field nanoPatterning (PnP). In embodiments, a thin film is created on a substrate via spin coating or solution drop casting. An elastomeric stamp is placed in conformal contact with the substrate. A visible or ultraviolet light (UV) light illuminates the assembly. The stamp is removed, and the exposed polymer film/substrate assembly is placed in a developing solvent and the process is completed by drying the sample. It is reasonable for one well versed in the art to make thicker films (several hundreds of microns) and high surface areas (greater than 0.1 square meters) using the optical patterning method describe herein.

Embodiments of the invention generally relate to optical patterning methods including, coating at least one layer of photosensitive conformable material that is optically transparent to at least one substrate associated with at least one conformable stamp to form a stamp/material/substrate complex, subjecting the stamp/material/substrate complex to light in that the light substantially penetrates the conformable material by forming nano-sized structures throughout the conformable material in a desired pattern depending on the materials/substrate utilized that optimizes storing and migrating of energy from the light, and removing the stamp, where the stamp is optically transparent, or alternatively, removing the stamp from the stamp/material/substrate complex to form a material/substrate complex, subjecting the material/substrate complex to light by forming nano-sized features throughout the conformable material in a desired pattern depending on the materials/substrate utilized that optimizes storing and migrating of energy from the light.

Another aspect of the invention generally relate to optical films including, at least one layer of photosensitive conformable material that is optically transparent associate with at least one substrate, at least one conformable stamp associated with the conformable material, and at least one layer of photosensitive conformable material having nano-sized features throughout the layer in a desired pattern for storing and migrating of energy from the light.

In embodiments, the conformable materials are patterned to be either oxidized or reduced. In embodiments, the material is used as an anode in an electrochemical battery. In other embodiments, the material is used as a cathode in an electrochemical battery. In yet other embodiments, the material is used as a cathode in a supercapacitor. Still yet in other embodiments, the material is used as an anode in a supercapacitor. In embodiments, the conformable material with sub-wavelength the features and the conformable material having a surface to provide nano-scale patterning of materials and where the surface having an area greater than 0.1 square meters. In embodiments, the feature sizes ranging from about 0.5 nm to about 100 nm. In embodiments, the conformable material is selected from the group consisting of epoxies, polyimides, and other polymer materials that is photopatternable.

In embodiments, the stamp is selected from the group consisting of polydimethylsiloxanes and perfluoropolyethers. In embodiments, the substrate is in the form selected from the group consisting of film(s), film(s) on glass, silicon wafer(s), and quartz. In embodiments, the light is in the visible or ultraviolet (UV) light having a wavelength ranging from about 300 nm to about 750 nm. In other embodiments, the light is in the visible and ultraviolet (UV) light selected from the group consisting of wavelengths of about 355, about 365, about 524 nm. Another aspect of the invention generally relates to the material/substrate complexes produced by the methods herein.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed:

1. A method for uniform dispersion of nano scaled redox particles in a conductive fiber or fibers, comprising:
   combining at least one nano sized redox capable material having metal oxides and/or metals, at least one conductive binder, and at least one solvent to form electrically conductive metal and/or metal oxide imbedded fiber or fibers by fiber spinning and said conductive polymeric binder having a molecular weight greater than 20,000 Daltons;
   coating a substrate with said electrically conductive fiber or fibers to form an active layer/substrate complex having a conductivity greater than 0.05 S/cm; and
   forming a battery or a capacitor from said active layer/substrate complex.

2. The method according to claim 1, wherein said solvent is conductive having a minimum conductivity of about 100 S/cm.

3. The method according to claim 1, wherein said solvent(s) is selected from the group consisting of chloroform, dimethyl formamide, chlorobenzene, dichlorobenzene, and any combination thereof.

4. The method according to claim 1, wherein said binder(s) is selected from the group consisting poly 3-hexylthiophene, Poly(2-methoxyl-5-(2-ethylhexoxy)1,4-phenylene vinylene, Poly(bis-2,5 (N-methyl, N-hexyl) 1,4-phenylene vinylene, Poly(ethylene dioxythiophene), Poly (propylene dioxythiophene), poly(pyrrole), substituted poly (pyrrole), and any other conjugated electroactive polymer.

5. The method according to claim 1, wherein said method further comprising embedding said fibers in an active layer of photosensitive conformable material that is optically transparent.

6. The method according to claim 1, wherein said nano sized redox capable materials are selected from the group consisting viologens, substituted viologens, and electron-poor conjugated materials, fullerenes, and any other material capable of electrochemical reduction.

7. The method according to claim 1, wherein said substrate(s) is selected from the group consisting of indium tin oxide, thin metal films, thin metal films on glass, silicon wafer, and any combination thereof.

8. The method according to claim 1, wherein said active layer is used as an anode in an electrochemical battery.

9. The method according to claim 1, wherein said active layer is used as a cathode in an electrochemical battery.

10. The method according to claim 1, wherein said active layer is used as a cathode in a supercapacitor.

11. The method according to claim 1, wherein said active layer is used as an anode in a supercapacitor.

12. The method according to claim 5, wherein said conformable material(s) is selected from the group consisting of epoxies, polyimides, and other polymer materials that is photopatternable.

13. The active layer/substrate complexes produced by the methods of claim 1.

* * * * *